(12) United States Patent
Moravanszky et al.

(10) Patent No.: US 7,936,355 B2
(45) Date of Patent: May 3, 2011

(54) METHODS FOR SIMULATING AND VISUALLY REPRESENTING OBJECTS USING PARTICLES

(75) Inventors: Adam Moravanszky, Zurich (CH); Dennis K E Gustafsson, Norrköping (SE)

(73) Assignee: NVIDIA Corporation, Santa Clara, CA (US)

( * ) Notice: Subject to any disclaimer, the term of this patent is extended or adjusted under 35 U.S.C. 154(b) by 825 days.

(21) Appl. No.: 11/607,990

(22) Filed: Dec. 4, 2006

(65) Prior Publication Data

US 2008/0129739 A1 Jun. 5, 2008

(51) Int. Cl.
*G06T 13/00* (2011.01)
(52) U.S. Cl. ........................................ 345/473
(58) Field of Classification Search ............... None
See application file for complete search history.

(56) References Cited

U.S. PATENT DOCUMENTS

| | | | | |
|---|---|---|---|---|
| 6,084,588 | A | * | 7/2000 | De Haan ........................ 345/419 |
| 6,348,924 | B1 | * | 2/2002 | Brinsmead ..................... 345/441 |
| 7,091,977 | B2 | * | 8/2006 | Jeong et al. .................... 345/473 |
| 2002/0087297 | A1 | * | 7/2002 | Kanemura ....................... 703/12 |
| 2004/0075662 | A1 | * | 4/2004 | Baraff et al. ................... 345/473 |

OTHER PUBLICATIONS

Szeliski, R., Tonnesen, D., Surface modeling with oriented particle systems, Jul. 1992, ACM SIGGRAPH Computer Graphics, vol. 26, Issue 2, pp. 185-194.*
Szeliski, Richard, & Tonnesen, David, Surface Modeling with Oriented Particle Systems, Digital Equip. Corp., Cambridge Research Lab, Dec. 30, 1991, CRL 91/14, Mass., USA.

* cited by examiner

*Primary Examiner* — Said Broome
(74) *Attorney, Agent, or Firm* — Patterson & Sheridan, LLP

(57) ABSTRACT

A method for visually representing an object by simulating the object as a particle with fewer degrees of freedom than those visually represented comprises simulating an object as a particle having linear motion. The method also comprises deriving an angular component of the particle from the linear motion of the particle. The method also comprises representing the object visually based on the linear motion and the derived angular component of the particle.

15 Claims, 6 Drawing Sheets

BAD REST POSE

GOOD REST POSE

METHODS FOR SIMULATING AND VISUALLY REPRESENTING OBJECTS USING PARTICLES

BACKGROUND OF THE INVENTION

1. Field of the Invention

This disclosure relates generally to simulating objects as particles and visually representing the objects based on the simulation and, more particularly, to methods for simulating particle systems with fewer degrees of freedom than those visually represented.

2. Description of Related Art

Contemporary computer and video games tend to incorporate a variety of sophisticated effects designed to mimic the behavior of objects in the real world. These effects include, for example, simulated collisions, explosions, object deformations, and so on. To this end, physics-based "animations" and "simulations" (hereafter these terms are used interchangeably regardless of application, specific method of display, or means of communicating related physics-based data) have been extensively investigated for the last three decades. Physics-based simulations generally involve simulating the movement and interaction of objects using the laws of physics. For example, a video game may model objects such as people, vehicles, arms, ammunition, and so on, as collections of rigid bodies that are animated by applying forces such as gravity, pressure, friction, viscosity, surface tension, mass-spring forces, and impact, to each rigid body. The term "rigid body" is used to describe animated objects that do not deform. Furthermore, rigid bodies are used to represent solid objects. Thus, rigid bodies may include solid objects such as, for example, billiard balls, guns, rocks, etc. In addition, rigid bodies may also be used as skeletons for various other objects such as, for example, character simulation, cars, crates, and barrels. In contrast, non-rigid bodies or deformable bodies are those used to model objects such as fluids, cloth and clothing.

In three dimensional computer graphics, it is common to simulate each rigid body with six degrees of freedom. The term "degree of freedom" is commonly used for describing in how many ways an object is allowed to move. Rigid bodies are generally simulated with six degrees of freedom because they have spatial extent. That is, they occupy some volume in space. Thus, a rigid body typically has linear movement which provides it with three degrees of freedom (forward/backward, left/right, up/down). In addition, because a rigid body has spatial extent, the rigid body also possesses angular movement because of its ability to rotate. This angular movement related to angular rotation adds three additional degrees of freedom to the rigid body, giving the rigid body a total of six degrees of freedom. These additional degrees of freedom would be pitching (tilting up and down), yawing (turning left and right), and rolling (tilting side to side).

In contrast, particles may be typically represented as having only three degrees of freedom because they look the same no matter which way they rotate. Furthermore, particles may be represented with only three degrees of freedom because they are infinitely small.

While rigid bodies may be used to represent objects, there are a number of shortcomings associated with this approach. For example, a larger amount of computational power may be needed to simulate objects as rigid bodies instead of simulating them as particles. This larger computational power requirement may exist because of the need to visually represent an object by simulating it as a rigid body that has six degrees of freedom. While this approach is widely used in computer graphics used in video games, in at least some situations, it may be more feasible to simulate objects as particles instead. This is because in video games, a large number of objects may have to be simulated in a short period of time. Furthermore, the high frame rate (i.e., speed at which the viewer moves from one frame to another) may also increase the demand on computational power for simulation. This is because more simulations may have to be conducted in a shorter period of time. Thus, despite the increase in computational power of processors, simulating objects as particles instead of rigid bodies may reduce the computational power needed for visually representing the objects. This saving of computational power may be useful as the saved computational power may be used for other purposes.

At the same time, this high frame rate may allow for a certain degree of approximation because the attention to detail of the viewer is relatively small. In addition, in many instances of computer graphics used in video games, the amount of approximation allowable in simulating objects on the screen may increase based on certain factors. For example, in situations where a large number of objects occupy a frame at the same time, the need for the highest quality of simulation of each individual object is reduced. This is because when there are many objects on the screen at the same time, it is visually harder for the viewer to observe simulation artifacts on individual objects as long as the overall simulation output is convincing.

In order to take advantage of the approximation allowed for in simulating objects in some applications for computer graphics, various systems have been developed to simulate objects as particles instead of rigid bodies. In the present disclosure, the terms "particle" and "particle system" is used interchangeably. A particle system refers to a plurality of particles. A particle is a point mass that moves under the influence of external forces such as, for example, gravity, vortex fields and collisions with stationary obstacles. Furthermore, a particle typically has only three degrees of freedom. These three degrees of freedom associated with a particle are related to the linear motion of the particle. Thus, the three degrees of freedom used to describe the motion of a particle are forward/backward, left/right, up/down.

Because of the ability to define the position of a particle with only three degrees of freedom, simulating an object as a particle instead of a rigid body is computationally more efficient. While this approach may decrease the computational power required to simulate an object, it suffers from the inherent deficiency that it does not simulate the degrees of freedom associated with the angular movement of the simulated object. As is commonly known, every physical object has angular movement associated with it along with linear movement. Thus, the use of a particle to simulate an object does not give a reasonably accurate visual representation of the simulated object.

The present disclosure is directed towards overcoming one or more problems associated with simulating objects as particles.

SUMMARY OF THE INVENTION

One aspect of the present disclosure includes a method for visually representing an object by simulating the object as a particle with fewer degrees of freedom than those visually represented. The method comprises simulating an object as a particle having linear motion. The method also comprises deriving an angular component of the particle from the linear motion of the particle. The method also comprises representing the object visually based on the linear motion and the derived angular component of the particle.

Another aspect of the present disclosure includes a method for visually representing an object in contact with a moving surface by simulating the object as a particle with fewer degrees of freedom than those visually represented. The method comprises simulating an object as a particle having linear motion. The method also comprises determining a linear motion of a moving surface in contact with the object. The method also comprises determining a relative motion between the linear motion of the particle and the linear motion of the moving surface. The method also comprises deriving an angular component of the particle based on the determined relative motion. The method also comprises visually representing the selected object based on the relative motion and the derived angular component of the particle.

Another aspect of the present disclosure includes a method for visually representing a non-spherical object as a particle with fewer degrees of freedom than those visually represented. The method comprises simulating a non-spherical object as a spherical particle having linear motion. The method also comprises deriving an angular component of the particle from the linear motion of the particle. The method also comprises determining an orientation based on the linear motion and the derived angular component. The method also comprises determining a local up axis of the particle based on the determined orientation. The method also comprises determining a correction vector based on the determined local up axis and a world up axis. The method also comprises visually representing the object based on the linear motion, the derived angular component, and the correction vector.

Yet another aspect of the present disclosure includes a method for visually representing a non-spherical object in contact with a moving surface by simulating the non-spherical object as a particle with fewer degrees of freedom than those visually represented. The method comprises simulating a non-spherical object as a spherical particle having linear motion. The method also comprises determining a linear motion of a moving surface in contact with the object. The method also comprises determining a relative motion between the linear motion of the particle and the linear motion of the moving surface and deriving an angular component of the particle based on the determined relative motion. The method also comprises determining an orientation based on the relative motion and the derived angular component. The method also comprises determining a local up axis of the particle based on the determined orientation. The method also comprises determining a correction vector based on the determined local up axis and a world up axis. The method also comprises visually representing the object based on the linear motion, the derived angular component, and the correction vector.

BRIEF DESCRIPTION OF THE DRAWINGS

The invention is described below in relation to several embodiments illustrated in the accompanying drawings. Throughout the drawings like reference numbers indicate like exemplary elements, components, or steps. In the drawings.

DESCRIPTION OF EXEMPLARY EMBODIMENTS

Exemplary embodiments of the invention are described below with reference to the corresponding drawings. These embodiments are presented as teaching examples. The actual scope of the invention is defined by the claims that follow.

In general, the disclosure includes embodiments directed towards simulating objects as one or more particles and further simulating the linear movement of particles. In addition, based on the simulated linear movement of the particle, an angular movement of the particle is determined at each simulation time step. Furthermore, the three additional degrees of freedom associated with the angular movement of the particle are added to the simulated linear degrees of freedom to provide a complete visual representation of the object. Thus, the object as visually represented seems to have both, angular and linear movement, though only the linear movement is physically simulated. Thus, the computational power that would have been used to simulate the angular movement is saved but the viewer still sees an angular movement of the object on the screen in addition to the object's linear movement.

Although several embodiments of the invention are particularly suited to video games, embodiments of the invention can also be adapted for use in other applications where objects have to be visually represented within short periods of time.

Figure 1:
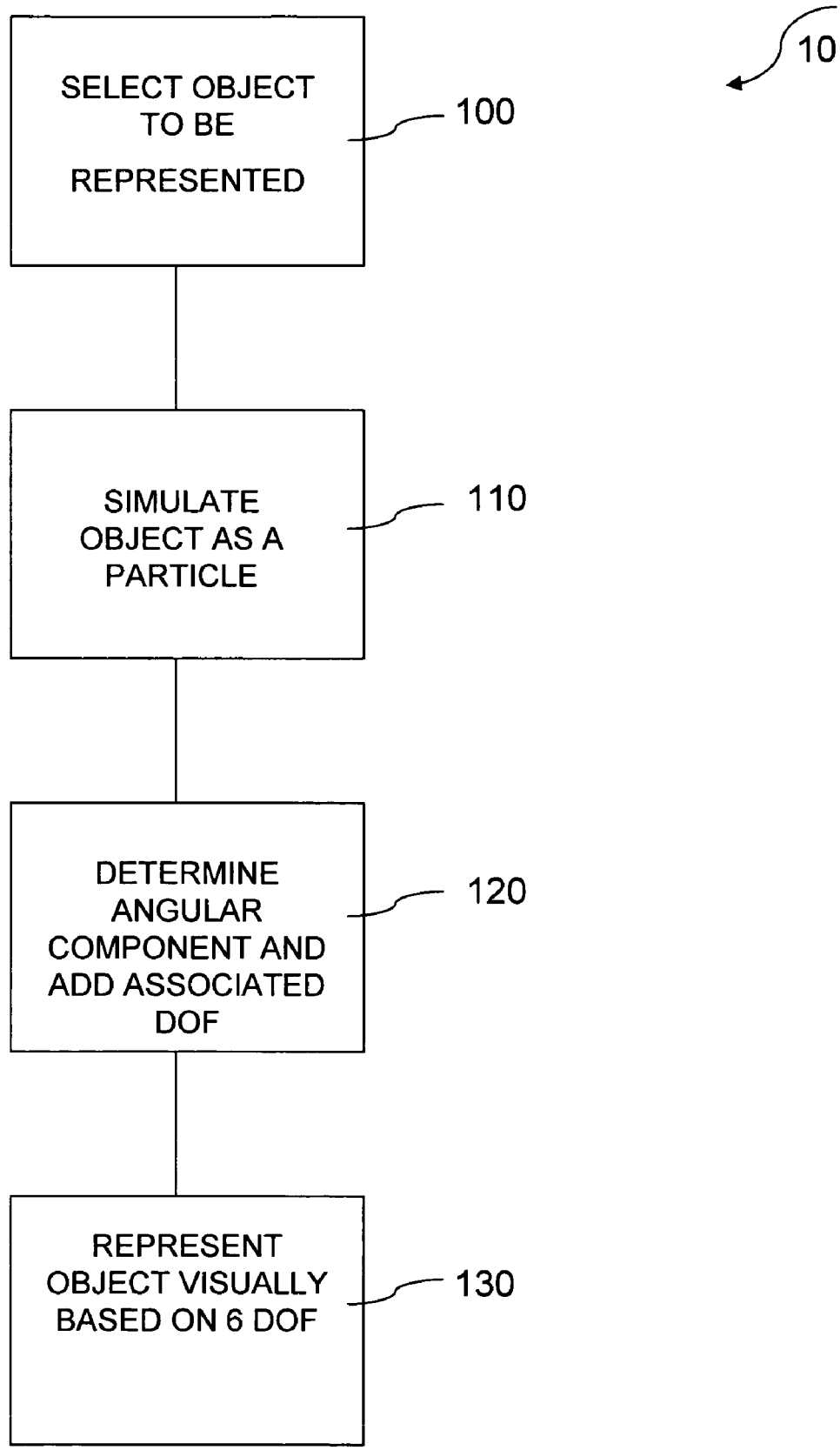
FIG. 1 is a flowchart illustrating a method of simulating an object using a particle according to an exemplary disclosed embodiment.

FIG. 1 is a flow chart 10 illustrating the steps involved in simulating and visually representing an object according to an exemplary disclosed embodiment. At step 100, the object to be represented is first selected. This selection may be carried out in many different ways. For example, a computer program may, in response to a user input, be used to select the object that may be in the form of a rigid body. This computer program may be written in any language. These languages may include, for example, C, C++, Pascal, Java, or any other programming language. In an exemplary embodiment a dedicated controller may be used to run the selection. Alternatively, a generic controller that performs other functions in addition to the selection may also be used. The controller used to run the simulation may include a central processing unit ("CPU"), a memory unit, I/O unit and any other component that may be used to effectuate the selection.

One skilled in the art will appreciate that the selection of the object to be visually represented may not be part of the actual simulation process. That is, the object to be simulated as a particle may be selected based on one or more criteria input into the computer program before the simulation occurs. The criteria for determining which objects should be visually represented based on a particle simulation may depend on characteristics of the object itself. These criteria may include, for example, the size and geometric shape of the object. Thus, a coin may be selected for visual representation based on particle simulation but a large table may not be selected for the simulation.

At step 110, the selected object is simulated as a particle. The components used to achieve this simulation may be similar to those used to select the object to be simulated, i.e., one or more computer programs and any related hardware and/or software. While in theory, the particle may be represented in any geometrical shape, a sphere is relatively easy to compute. Therefore, in an exemplary embodiment, the object may be simulated as a spherical particle. Furthermore, because the object is simulated as a particle, the orientation of the simulated particle may be represented via three degrees of freedom as opposed to the six degrees of freedom used to represent the orientation of an object. Specifically, these three degrees of freedom are based on the linear movement of the particle. That is, forward/backward, left/right, and up/down.

At step 120, the angular component of the object is determined. The angular component of the object may be determined based on a number of factors. These factors may include, for example, the simulated linear movement of the particle, the position of the particle; the nature of the contact surface that the particle may rest on, and the size of the particle. In addition, other factors that may be used to determine the angular component of the object may also be involved in this determination.

In an exemplary embodiment, a specialized algorithm may be used to determine the angular component. This algorithm may be coded into a program by using any programming language suitable for this application. These languages may include, for example, C, C++, Pascal, Java, and other such languages. Furthermore, the program written to determine the angular component of the particle may be configured to run on a generic controller that is used to perform other functions in addition to determining the angular component of the particle. Alternatively, the program may be configured to run a specialized controller that is dedicated to perform the function of determining the angular component of the particle. Similar to a controller configured to run the simulation, this controller may also include components such as a CPU, RAM, ROM, I/O modules and any other component that may be used to determine the angular component of the particle.

One skilled in the art will appreciate that any code that performs the function of determining the angular component of the particle based on the simulated linear movement of the particle and other factors may be used without departing from the scope of the disclosure. Furthermore, based on the angular component derived at this time, the three additional degrees of freedom that may be used to describe the angular motion of the object are determined. As described above, these three additional degrees of freedom are: pitching (tilting up and down), yawing (turning left and right), and rolling (tilting side to side). In an exemplary embodiment, a formula such as the following may be used to determine the angular component of the particle:

$$\vec{\omega} = r(\vec{v} \times \hat{n}) \quad (1)$$

Where $\vec{\omega}$=angular velocity vector (rad/s), r=radius (m), $\vec{v}$=linear particle velocity (m/s) and $\hat{n}$=normalized contact normal vector.

Thus, in an exemplary embodiment, the new orientation of the particle is determined based on the current orientation of the particle, the current angular velocity and the number of steps in which the simulation is performed. For example, the new orientation of the particle may be determined by the following formula:

$$\text{new orientation=current orientation+current angular velocity*time step} \quad (2)$$

At step 130, the object is represented visually based on the three degrees of freedom associated with the linear movement of the simulated particle and the three additional degrees of freedom associated with the angular component of the object determined at step 120.

Figure 2:
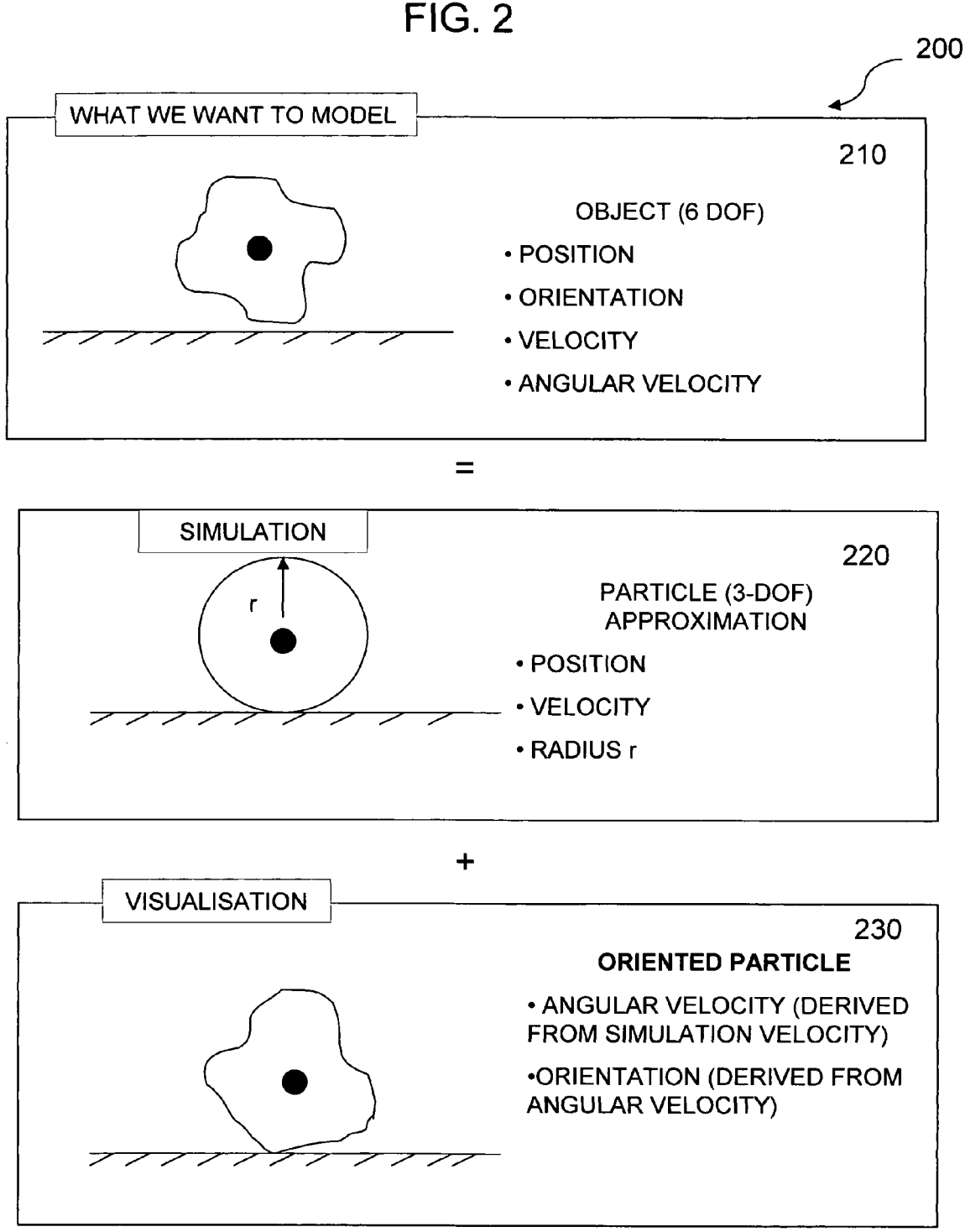
FIG. 2 is a pictorial representation of simulating an object using a particle according to an exemplary disclosed embodiment.

FIG. 2 illustrates a pictorial representation 200 of the various stages associated with simulating an object moving on a stationary surface. At stage 210 the object to be simulated is first selected. As described above, this selection may occur based on a user input, a computer program, or a combination of both. Furthermore, as also described above, the selection of the object may not be part of the actual simulation. That is, the object to be simulated may be selected based on criteria input into the program that performs the simulation.

In addition, the selected object may have a number of attributes. These attributes may include, for example, a position of the object, the six degrees of freedom representing the ways in which the object may move, the linear velocity, and the angular velocity of the object when the object moves. As described above, the six degrees of freedom exist because the object has spatial extent.

At stage 220, the object is simulated as a particle. The particle may be typically represented by the three degrees of freedom indicating the ways in which the particle may move. In addition, the particle may have attributes such as, for example, a position of the particle, any linear velocity the particle may have when it moves, and the size of the particle. Theoretically, the particle may have any geometrical shape. However, for purposes of computational efficiency, the particle is beneficially represented as a sphere.

At stage 230, the simulated particle is given a visual effect based on its new orientation. This visual effect of the simulated particle may be based on a number of factors. These factors may include, for example, the particle's angular component, the particle's current orientation, and the number of simulation time steps. The angular component of the particle may be computed in a number of ways. In an exemplary embodiment, the angular component is derived from the simulated linear velocity determined at stage 220. For example, formula (1) described above, may be used to determined the angular component of the simulated particle. In addition, any other method of determining the angular component of the particle based on its current orientation may be used without departing from the scope of the present disclosure.

Thus, in an exemplary embodiment, though the particle may physically only slide over the surface, the visual representation would include not only the linear movement of sliding over the surface but also a tumble and roll. That is, the physical simulation is only based on the three degrees of freedom associated with the linear movement of the particle, but then, based on the mathematical determination of the angular component, the object is visually represented as tumbling and rolling. Thus, the three additional degrees of freedom associated with the angular movement of the particle are added to the simulated linear degrees of freedom to provide a complete visual representation of the object.

Figure 3:
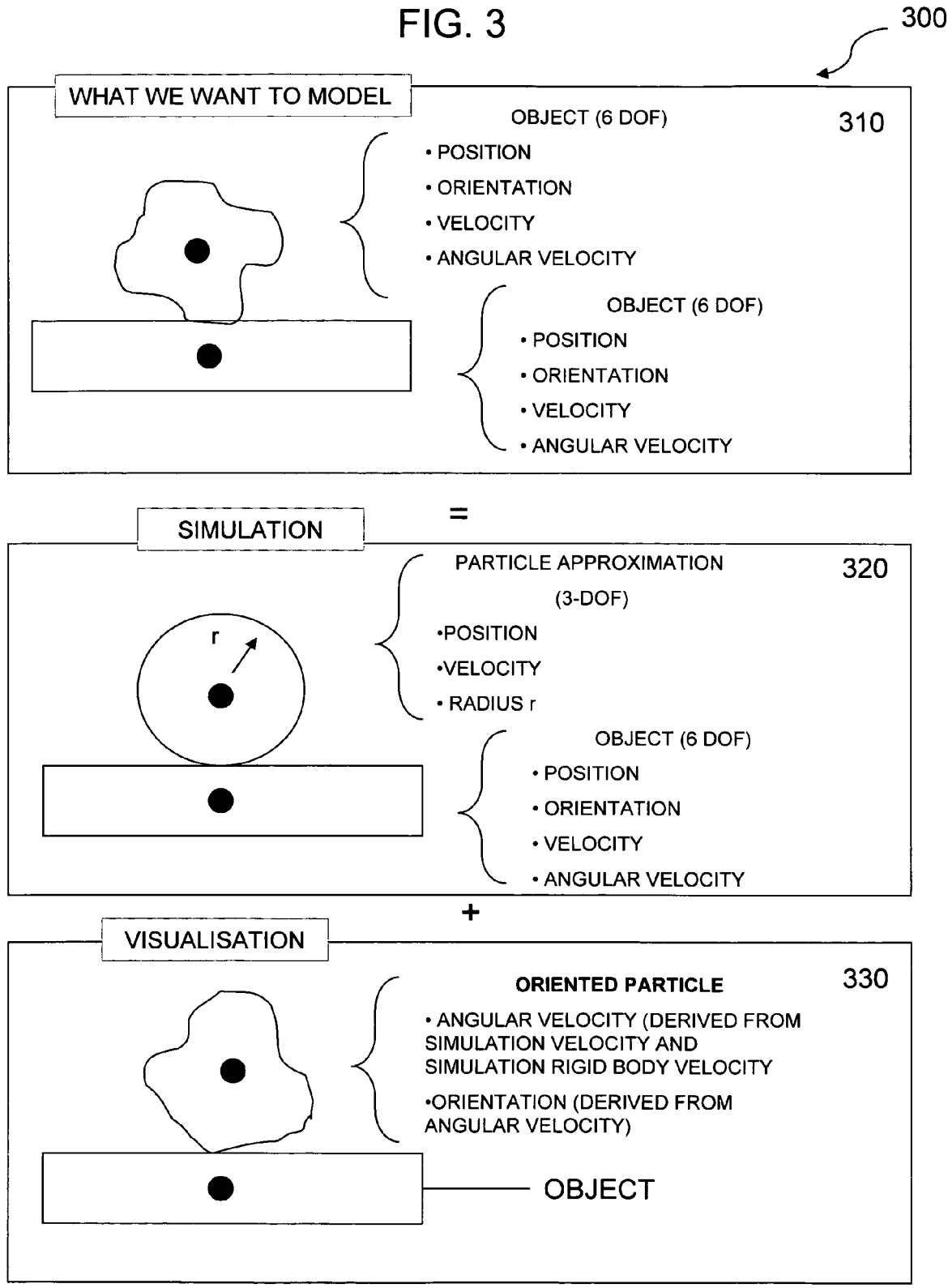
FIG. 3 is a pictorial representation of simulating an object using a particle system according to an alternative exemplary disclosed embodiment.

FIG. 3 is a pictorial representation 300 of the various stages associated with simulating an object that is in motion on a moving contact surface. That is, both the object to be simulated and the contact surface on which the object is placed are in motion. At stage 300, the object that is in contact with the moving surface is selected for simulation. As mentioned above, this stage may be outside of the actual simulation process and the object to be simulated may be selected based on criteria input into a computer program that performs the simulation. In addition, as also mentioned above, each object to be simulated and the moving contact surface may be associated with their respective attributes such as, for example, position, orientation, six degrees of freedom describing the object's orientation, linear velocity, and angular velocity.

At stage 320, the object that needs to be visually represented is simulated as a particle that has three degrees of freedom, a position, velocity, and size. As mentioned above, while the particle may be theoretically represented as any geometrical figure, beneficially, the particle is simulated as a sphere. The size of the particle may be represented by the radius "r" of the particle. However, the rigid body, i.e., the contact surface on which the particle rests may not simulated as a particle. Thus, the simulated particle is associated with attributes such as, for example, its current position, linear velocity, and size. At the same time, the moving contact surface continues to retain its attributes of a rigid body such as, for example, position, orientation, linear velocity, and angular velocity. At this time, the relative velocity between the linear velocity of the simulated particle and the linear velocity of the moving contact surface is calculated. This relative velocity may be calculated using any technique known to one skilled in the art. For example, in an exemplary embodiment, the relative velocity may be calculated using the following formula:

$$\vec{v}_{rel} = \vec{v}_{particle} - \vec{v}_{surface} \quad (3)$$

Where $\vec{v}_{rel}$=relative particle velocity (m/s), $\vec{v}_{particle}$=velocity of particle (m/s) and $\vec{v}_{surface}$=velocity at surface on contacting body (m/s).

At stage 330, the simulated particle is given a visual effect based on its new orientation. This visual effect of the simulated particle may be based on a number of factors. These factors may include, for example, the particle's angular component, the particle's current orientation, and the number of simulation time steps. The angular component of the particle may be computed in a number of ways. In an exemplary embodiment, the angular component is derived from the simulated relative velocity determined at stage 320. Thus, for example, the angular component may be calculated by using the following formula:

$$\vec{\omega} = r(\vec{v}_{rel} \times \hat{n}) \quad (4)$$

Where $\vec{\omega}$=angular velocity vector (rad/s), r=radius (m), $\vec{v}_{rel}$=relative particle velocity (m/s) and n=normalized contact normal vector.

In addition, any other technique usable to derive the angular component from the simulated relative velocity of the particle may be used without departing from the scope of the disclosure.

Furthermore, at this stage, the three additional degrees of freedom associated with the angular movement of the particle are added to the simulated linear degrees of freedom to provide a complete visual representation of the object. Thus, though the object is physically simulated as having only linear motion with respect to the moving contact surface, during a visual representation of the object, the object is also provided with angular motion based on the angular component derived from the particle velocity and velocity of the moving contact surface.

In some situations, simulating an object as a spherical particle alone may not provide an accurate visual representation of the object. That is, while the spherical geometry of the particle may be an efficient way to simulate collisions between objects, objects whose shape is very different from that of a sphere may not be simulated convincingly based on the simulation of the object as a spherical particle alone. In particular, because of the geometrical characteristic of the sphere, any orientation of the sphere is as good as the other. This same feature may not be the case for objects whose shape is very different from that of a sphere. For example, a coin can physically rest in only two positions—a heads position or a tails position. Specifically, a coin can only have two good rest poses, i.e., a pose with the tails side up and a pose with the heads side up. The coin cannot have any other realistic pose based on its geometry. This is unlike the case of the sphere where the sphere could have infinite poses based on its geometry.

Figure 4:
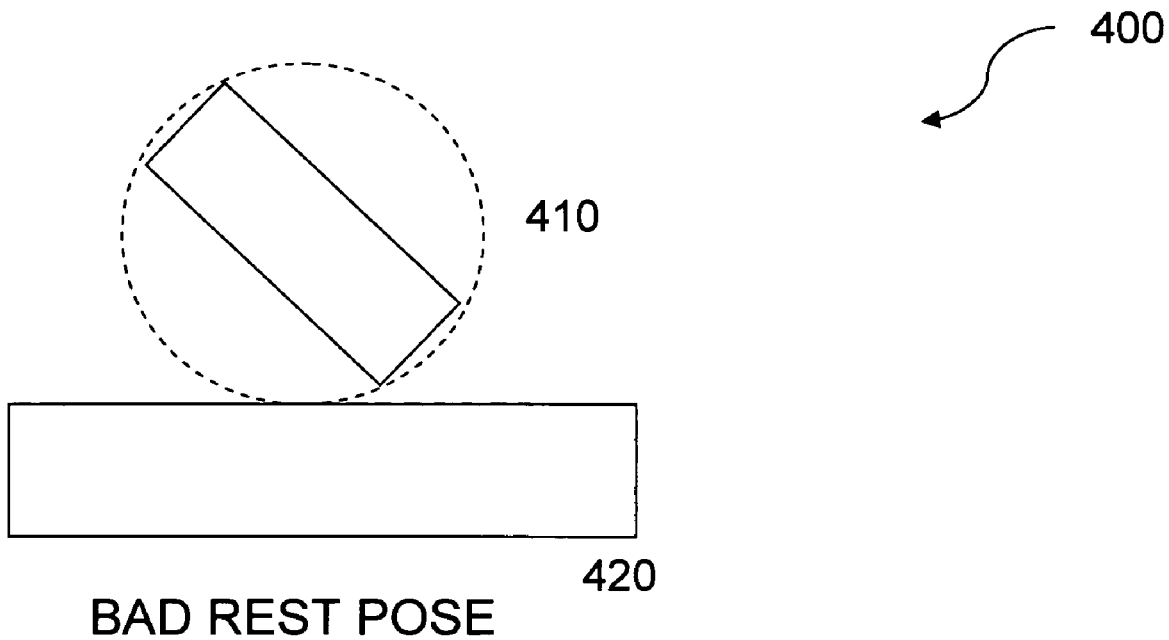
FIG. 4 is a pictorial representation of an object that is simulated as a spherical particle in an exemplary rest pose.

FIG. 4 is a pictorial representation 400 of a visual representation of coin that is simulated as spherical particle. FIG. 4 includes a coin 410 resting on a surface 420. As shown in FIG. 4, if the coin 410 is simulated as a spherical particle, the new orientation of the coin 410 that is determined based on the spherical particle's linear and angular velocity may cause the coin 410 to rest in an inclined position against the surface 420. However, as described above, the coin 410 may not realistically rest on the surface 420 as shown in FIG. 4. That is, if the coin is simulated as a spherical particle, the coin may randomly attain a pose that may not be visually convincing to a viewer. Such a pose shown in FIG. 4 may be known as a bad rest pose.

Figure 5:
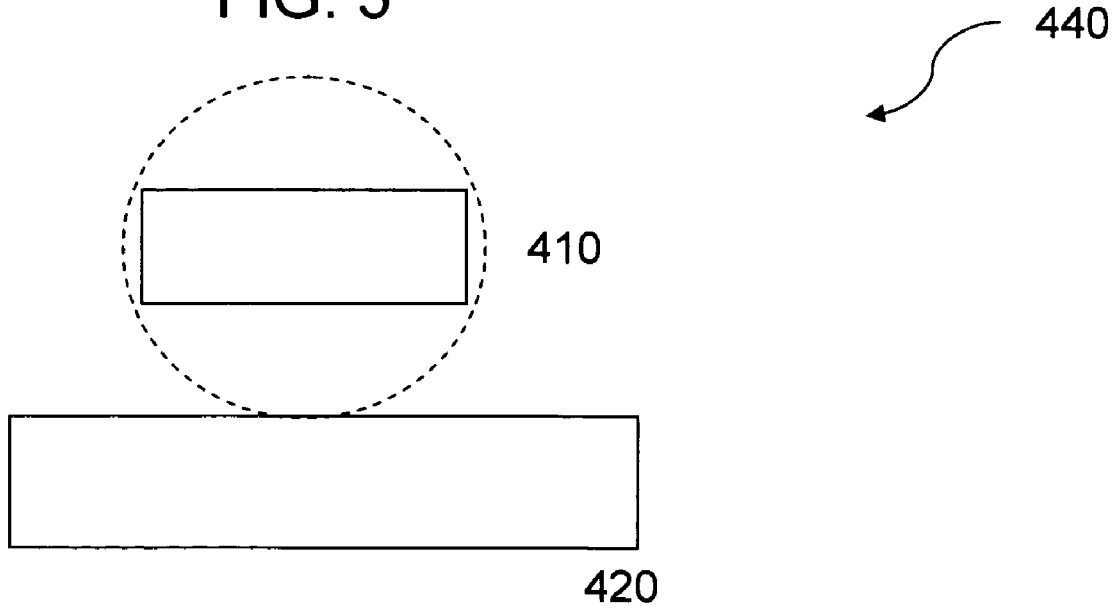
FIG. 5 is a pictorial representation of an object that is simulated as a spherical particle in an alternative exemplary rest pose.

In order to achieve a realistic visual representation of the coin 410, there is a need to ensure that the coin 410 attains a good rest pose. FIG. 5 is a pictorial representation 440 of the coin 410 in a good rest pose. As shown in FIG. 5, coin 410 rests on surface 420 in a good rest pose, i.e., either the heads side up or the tails side up. One skilled in the art will appreciate that while a coin has been used to describe the various poses of a non-spherical object, other non-spherical objects may also have good rest poses and bad rest poses.

One method of ensuring an object is always visually represented in a good rest pose is to simulate the object as a particle having a geometrical shape that is as close as possible to the actual shape of the object itself. However, this approach may not be feasible because of the difficulty in simulating particles having non-spherical shapes. For example, because of the complex nature of some shapes, the time and computational power required for simulation may increase to a point where such a simulation is not feasible.

A more feasible approach to solving the above-described problem may be to align the simulated particles along the particles' up axis. Specifically, every particle is associated with a number of up axes. In particular, each up axis corresponds to a side of the object that is simulated as a particle and points in the upward direction. Thus, for example, a coin will have two valid up axes (heads up or tails up). On the other hand, a cube will have six valid up axes because of having six sides. That is, one axis for each side.

Generally, in an exemplary embodiment, the orientation of a particle (that is still computed based on the angular velocity as discussed above) is modified in a way so that the particle always tries to align one of its local axes with the world up axis. That is, a particle's local up axis is made to coincide with the particle's world up axis to ensure that the particle has attained a good rest pose. Typically, the world axis of a particle stays constant not matter how much the particle rotates. On the other hand, the local up axis changes as the particle rotates. Thus, the disclosed method generally involves determining the local up axis that is closest to the world up axis and aligning the determined local up axis with the world up axis such that the object obtains a good rest pose.

Figure 6:
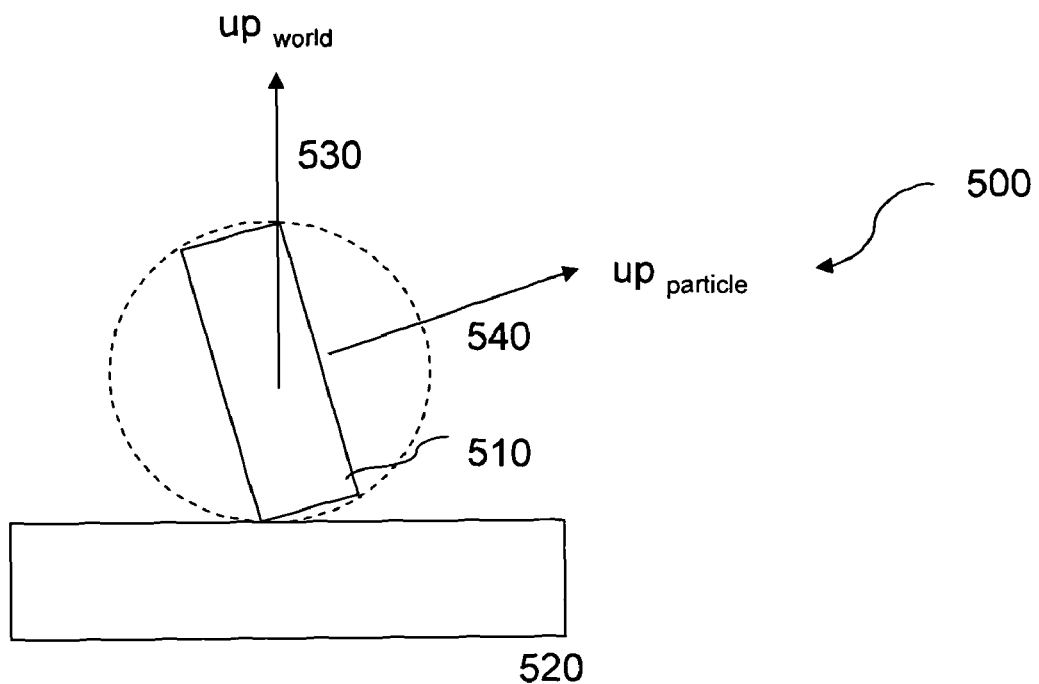
FIG. 6 is a pictorial representation of a simulated particle according to an exemplary disclosed embodiment.

FIG. 6 is a pictorial representation 500 of a simulated particle having a world up axis and a local up axis according to an exemplary disclosed embodiment. Pictorial diagram 500 includes a particle 510 resting in an inclined position on a surface 520. Furthermore, the simulated particle has a world up axis 530 and a closest local up axis 540. In this disclosure the terms "local up axis" and "closest local up axis" will be used interchangeably. This is because, for the purposes of this disclosure, the disclosed local up axis of the particle is the local up axis closest to the world up axis of the particle.

As seen in FIG. 6, the world up axis 530 is pointing in the upward direction but the local up axis 540 is pointing in a direction that is angularly displaced from the world up axis 530. Furthermore, the local up axis 540 will change as the particle 510 continues to rotate. The position of the particle 510 shown in FIG. 5 is the position an object may be in when simulated as a spherical particle and when the new orientation is based only on the current orientation and the current angular velocity. As described above, this position may be randomly assumed by the particle 510 upon simulation of an object as a spherical particle alone.

In an exemplary embodiment, the closest local up axis 540 is determined from an orientation of the particle that is based on the particle's angular component. That is, when the orientation of the particle is determined based on, for example, the current orientation and the angular velocity, the simulation program may also determine the local up axis that is closest to the global up axis of the particle in this orientation. Thus, at each time step of simulation, the new orientation of each particle will be computed based on the angular velocity, the current orientation, and the current divergence from the closest valid rest pose.

Figure 7:
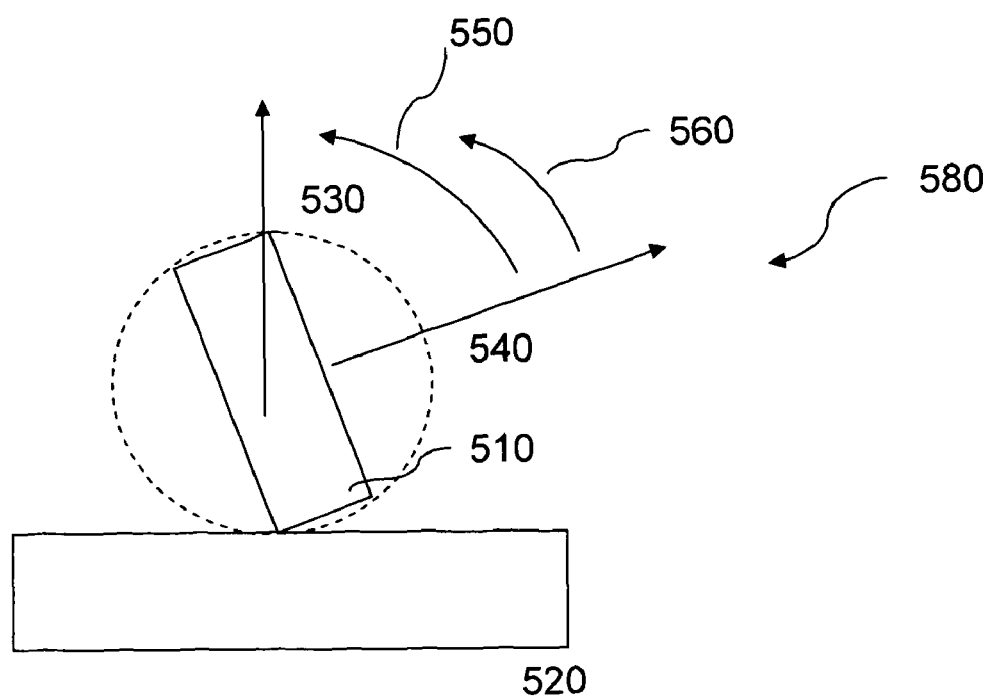
FIG. 7 is a pictorial representation of a simulated particle according to an exemplary disclosed embodiment.

FIG. 7 is a pictorial representation 580 of a simulated particle where the local up axis 540 is made to align with the world up axis 530 according to an exemplary disclosed embodiment. As shown in FIG. 7, in an exemplary embodiment, a poseCorrection vector 550 is calculated to determine the amount by which the particle 510 should rotate such that the particle 510 moves from a current rest pose to a good rest pose. FIG. 7 also includes an additional vector 560 which will be described later. In an exemplary embodiment, the poseCorrection vector 550 is determined by performing a cross product of the world up axis and the local up axis. That is:

$$\text{poseCorrection} = \text{up}_{world} \times \text{up}_{local} \tag{5}$$

While formula (5) discloses one method of determining the poseCorrection vector 550, any other method may also be used to determine the poseCorrection vector 550 without departing from the scope of this disclosure. Furthermore, the poseCorrection vector 550 may be determined by any software, hardware, or a combination thereof, that may be configured to calculate the poseCorrection vector 550.

In an exemplary embodiment, the poseCorrection vector 550 is a three dimensional vector. In addition, the length of the poseCorrection vector 550 represents the angle by which the particle 510 should rotate such that the object is in a good rest pose. Furthermore, the direction of the poseCorrection vector 550 represents the rotation axis along which the particle 510 should rotate.

While the poseCorrection vector 550 represents the amount by which the particle 510 should rotate such that the local up axis 540 aligns with the world up axis 530, in some implementations the transition from the current rest pose to a good rest pose may have to be smooth rather than abrupt. For example, there may be a need to make the transition from the current rest pose to a good rest pose in discrete time steps to ensure that the visual representation of the rotating object looks convincing to a viewer. To this end, the length of the poseCorrection vector may be clamped. That is, the angle along which the object has to rotate in a given time period is clamped to a certain value. This clamping of the angle may make the object rotate gradually to its good rest pose instead of rotating to its good rest pose instantly. The clamped rotation vector may be known as poseCorrection$_{clamped}$ 560.

The poseCorrection$_{clamped}$ vector 560 may be calculated in a number of ways. In an exemplary method, if the length of the poseCorrection vector 550 is greater than a predetermined value, the poseCorrection$_{clamped}$ vector 560 may be automatically or manually set to a number lower than the predetermined value. Thus, the total rotation needed to move the particle 510 from a current rest pose to a good rest pose may be achieved by using the poseCorrection$_{clamped}$ vector 560 in every simulation time step. For example, if the length of the poseCorrection vector 550 is 45 degrees, the length of the poseCorrection$_{clamped}$ vector 560 may be set to 5 degrees so that the particle 510 will move to its good rest pose over time. In an exemplary embodiment a software program written in any computing language such as, for example, C, C++, Java, etc., may be used to calculate poseCorrection$_{clamped}$. In addition any other tool such as, for example, any hardware, or a combination of hardware and software, may be used to calculate the poseCorrection$_{clamped}$ vector 560.

After the poseCorrection$_{clamped}$ vector 560 has been calculated, the new orientation of a particle can be expressed by the following formula:

$$\text{new orientation} = \text{current orientation} + \text{current angular velocity} * \text{time step} + \text{poseCorrection}_{clamped} \tag{6}$$

One skilled in the art will appreciate that the calculation and use of the poseCorrection$_{clamped}$ vector 560 is optional. For example, there may be cases where there is no need for a smooth transition from the current rest pose to a good rest pose. In such a case, the poseCorrection vector 550 alone may be used to rotate the object 510 from a current rest pose to a good rest pose. Furthermore, one skilled in the art will appreciate that the poseCorrection vector 550 may not be used all the time. Specifically, use of the poseCorrection vector 550 may be limited to situations where the linear velocity of the simulated particle is below a predetermined threshold. For example, the poseCorrection vector 550 may be used to simulate the particle as it is about to reach a rest pose.

In another exemplary embodiment, a better visual representation of the non-uniform/asymmetric body may also be obtained by varying the radius of the simulated particle. Specifically, the radius of the simulated particle may be made to vary as the particle rotates. Thus, though the non-uniform/asymmetrical object is simulated as a spherical particle, a viewer is under the impression that a non-uniform object is colliding with the environment.

Figure 8:
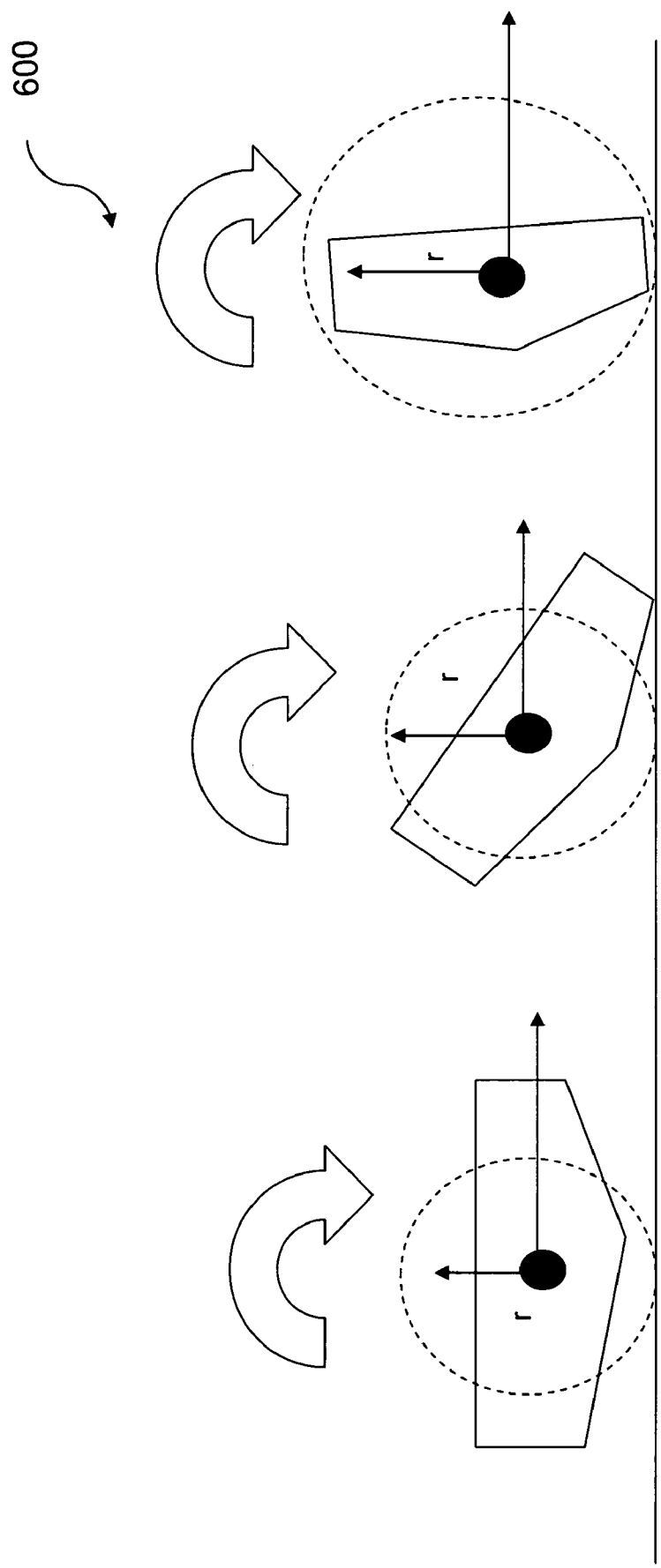
FIG. 8 is a pictorial representation of a simulated particle according to an alternative exemplary disclosed embodiment.

FIG. 8 is a pictorial representation 600 according to an exemplary disclosed embodiment wherein the radius of the simulated spherical particle is varied as the particle rotates. As seen in FIG. 8, the radius r of the spherical particle is varied as the particle rotates. In particular, the radius r varies in each discrete simulation time step. Thus, in an exemplary embodiment, the new orientation may be determined according to the formula (4), where the angular velocity in each time step is determined according to the radius of the particle in that time step.

The disclosed method of simulating and visually representing objects based on more degrees of freedom than what is physically simulated may be used in any system for visually representing objects. Thus, these systems may include, for example, physics-based animation systems. These physics-based animation systems may be used in computer games and other real-time applications where performance and efficiency are needed. By physically simulating an object as a particle having only three degrees of freedom as opposed to the six degrees of freedom but visually representing the object as having six degrees of freedom, the disclosed method may save computational power. In addition, this method of simulation also increases the speed of simulation. This increase in speed of simulation may be an important feature in applications such as, for example, video games. This is because, in such applications, objects have to be visually represented on screen for short periods of time but the frame rate is very high.

Furthermore, by aligning the local up axis of the object with the global up axis of the object, the disclosed method may ensure that non-spherical objects are visually represented in a convincing manner. In particular, the disclosed method combines the efficiency of simulating an object as a spherical particle along with the feature of rotating the object based on the object's global and local axes. This combination may ensure a computationally and time-wise efficient simulation along with a visually convincing representation of the moving object.

It will be apparent to those skilled in the art that various modifications and variations can be made in the disclosed method without departing from the scope of the disclosure. Additionally, other embodiments of the disclosed method will be apparent to those skilled in the art from consideration of the specification. It is intended that the specification and examples be considered exemplary only, with a true scope of the disclosure being indicated by the following claims and their equivalents.

What is claimed is:

1. A method for visually representing an object by simulating the object as a spherical particle with fewer degrees of freedom than those visually represented, the method comprising:
    simulating an object as a spherical particle having an orientation represented by only three degrees of freedom based on the linear motion of the spherical particle;
    varying a radius of the spherical particle in each simulation time step based on a shape of the object and a position of the object on a contact surface;
    deriving, via a specialized controller, an angular component of the spherical particle based on the radius of the spherical particle in each simulation step;
    determining three rotational degrees of freedom for the object based on the derived angular component of the spherical particle;
    determining a modified orientation for the object based on the three linear degrees of freedom associated with the spherical particle and the three rotational degrees of freedom determined for the object; and
    generating a visual display of the object having six degrees of freedom based on the modified orientation for the object.

2. The method of claim 1, further including deriving the angular component of the spherical particle based on at least one of the linear motion of the spherical particle, a position of the spherical particle, a nature of a contact surface that that the spherical particle may rest on, and a size of the spherical particle.

3. The method of claim 1, wherein the step of determining a modified motion for the object comprises the step of determining a new orientation of the spherical particle based on a current orientation of the spherical particle and the derived angular component of the spherical particle.

4. A method for visually representing an object in contact with a moving surface by simulating the object as a spherical particle with fewer degrees of freedom than those visually represented, the method comprising:
    simulating an object as a spherical particle having an orientation represented by only three degrees of freedom based on the linear motion of the spherical particle;
    determining a linear motion of a moving surface in contact with the object;
    determining a relative motion between the linear motion of the spherical particle and the linear motion of the moving surface;
    varying a radius of the spherical particle in each simulation time step based on a shape of the object and a position of the object on a contact surface to generate a set of radii;
    deriving, via a specialized controller, an angular component of the spherical particle based on the radius of the spherical particle in each simulation step;
    determining three rotational degrees of freedom for the object based on the derived angular component of the spherical particle;
    determining a modified orientation for the object based on the three linear degrees of freedom associated with the spherical particle and the three rotational degrees of freedom determined for the object; and
    generating a visual display of the object having six degrees of freedom based on the modified orientation for the object.

5. The method of claim 4, further including simulating the moving surface as a rigid body.

6. The method of claim 4, further including deriving the angular component of the spherical particle based on at least one of a size of the spherical particle and a nature of the moving surface.

7. The method of claim 4, wherein the step of determining a modified orientation of the spherical particle comprises the step of determining a new orientation of the spherical particle based on a current orientation of the spherical particle and the derived angular component of the spherical particle.

8. A method for visually representing a non-spherical object as a spherical particle with fewer degrees of freedom than those visually represented, the method comprising:
    simulating an non-spherical object as a spherical particle having an orientation represented by only three degrees of freedom based on a linear motion of the spherical particle;
    varying a radius of the spherical particle in each simulation time step based on a shape of the object and a position of the object on a contact surface to generate a set of radii;
    deriving, via a specialized controller, an angular component of the spherical particle based on the radius of the spherical particle in each simulation step;
    determining an orientation based on the linear motion and the derived angular component;
    determining a local up axis of the spherical particle based on the determined orientation;
    determining a correction vector based on the determined local up axis and a world up axis;
    determining three rotational degrees of freedom for the object based on the derived angular component of the spherical particle;
    determining a modified orientation for the object based on the three linear degrees of freedom associated with the spherical particle and the three rotational degrees of freedom determined for the object; and
    generating a visual display of the object having six degrees of freedom based on the modified orientation for the object.

9. The method of claim 8, wherein determining the local up axis includes determining a local up axis from a collection of local up axes such that the determined local up axis is closest to the world up axis.

10. The method of claim 8, wherein determining a correction vector includes computing a cross product of the determined local up axis and the world up axis.

11. The method of claim 8, wherein the step of determining the modified orientation includes the step of aligning the determined local up axis with the world up axis based on a length and a direction of the correction vector.

12. The method of claim 11, wherein the length of the correction vector is an angle by which the determined local up axis is rotated to align the determined local up axis with the world up axis.

13. The method of claim 11, wherein the direction of the correction vector is a rotation axis along which the determined local up axis is rotated to align the determined local up axis with the world up axis.

14. The method of claim 8, further comprising the step of clamping a length of the correction vector to form a clamped correction vector, wherein a length of the clamped correction vector is less than a length of the correction vector by a predetermined amount.

15. The method of claim 14, wherein the modified orientation is also determined based on the clamped correction vector.

* * * * *